United States Patent
Chen et al.

(10) Patent No.: US 9,413,681 B2
(45) Date of Patent: Aug. 9, 2016

(54) TELECOMMUNICATIONS SYSTEM AND METHOD

(75) Inventors: Xiaobao Chen, Wiltshire (GB); Philippe Lucas, Bievres (FR)

(73) Assignee: 3G Licensing S.A., Luxembourg (LU)

( * ) Notice: Subject to any disclaimer, the term of this patent is extended or adjusted under 35 U.S.C. 154(b) by 796 days.

(21) Appl. No.: 12/224,919

(22) PCT Filed: Feb. 16, 2007

(86) PCT No.: PCT/GB2007/000546
§ 371 (c)(1),
(2), (4) Date: Dec. 16, 2008

(87) PCT Pub. No.: WO2007/110564
PCT Pub. Date: Oct. 4, 2007

(65) Prior Publication Data
US 2009/0274092 A1 Nov. 5, 2009

(30) Foreign Application Priority Data
Mar. 24, 2006 (EP) .................................. 06290517

(51) Int. Cl.
*H04W 40/00* (2009.01)
*H04L 12/919* (2013.01)
*H04L 12/54* (2013.01)
*H04L 12/801* (2013.01)
*H04L 12/851* (2013.01)
*H04L 12/927* (2013.01)
(Continued)

(52) U.S. Cl.
CPC .......... *H04L 47/767* (2013.01); *H04L 12/5695* (2013.01); *H04L 47/14* (2013.01);
(Continued)

(58) Field of Classification Search
USPC ............ 370/328, 331, 230, 230.1; 455/432.1, 455/434, 435, 2
See application file for complete search history.

(56) References Cited

U.S. PATENT DOCUMENTS 8,451,854 B1* 5/2013 Sayrafian-Pour .............. 370/419
2002/0054584 A1* 5/2002 Dempo ......................... 370/338
(Continued)

FOREIGN PATENT DOCUMENTS

EP        1206 098 A2     5/2002     ............. H04L 29/06

OTHER PUBLICATIONS

Xiaoming Fu et al., "QoS-Conditionalized Binding Update in Mobile IPv6 draft-tkn-nsis-gosbinding-mipv6-00.txt", pp. 28, NSIS Working Group Internet—Draft, The Internet Society (2002), Jan. 15, 2002, http://www.sanface.com/txt2pdf.html.

*Primary Examiner* — Donald Mills
*Assistant Examiner* — Henry Baron
(74) *Attorney, Agent, or Firm* — Haverstock & Owens LLP

(57) ABSTRACT

A telecommunications system is operable to provide a facility for a communications session to a mobile node using an internet protocol. When changing affiliation from one of a first and second packet data network to the other of the first and second packet data network, a mobile node is operable to generate a service level identifier representing a requested priority to be afforded to the internet packets communicated to and from the mobile node with respect to other internet packets communicated to and from other nodes. The mobile node is also operable to generate a binding update internet packet providing a care of address of the mobile and an indication of the service level identifier in the binding update internet packet and to communicate the binding update internet data packets to a home agent of the mobile node. The home agent is operable in response to the binding update to identify the service level identifier and to communicate the internet packets in accordance with the requested priority represented by the service level identifier. The telecommunications system can prioritize the transmission of internet packets according to a priority requested by the mobile node represented by the service level identifier thus reducing a likelihood that mobile node will experience delays or interruptions in the transmission of data.

26 Claims, 9 Drawing Sheets

(51) Int. Cl.
*H04L 12/911* (2013.01)
*H04W 36/00* (2009.01)
*H04W 60/00* (2009.01)
*H04W 28/24* (2009.01)
*H04W 80/04* (2009.01)

(52) U.S. Cl.
CPC ........ *H04L47/2408* (2013.01); *H04L 47/2425* (2013.01); *H04L 47/805* (2013.01); *H04L 47/824* (2013.01); *H04W 36/0011* (2013.01); *H04W 60/00* (2013.01); *H04W 28/24* (2013.01); *H04W 80/04* (2013.01)

(56) References Cited

U.S. PATENT DOCUMENTS

2008/0259848 A1* 10/2008 Aso et al. ................. 370/328
2009/0080387 A1* 3/2009 Dell'Uomo et al. ......... 370/338

* cited by examiner

TELECOMMUNICATIONS SYSTEM AND METHOD

FIELD OF THE INVENTION

The present invention relates to telecommunications systems and methods, which provide a mobile communications facility to mobile nodes, using a packet communication network comprising a first network and second network, in which a binding update message is sent from the mobile node to the mobile node's home agent to facilitate the communication of packets to and from the mobile node.

BACKGROUND OF THE INVENTION

Mobile Internet Protocols (IP) provide a procedure for communicating using Internet Protocol (IP) packets to support IP based communications in mobile communications networks. One feature of Mobile IP is to provide a scheme in which a mobile node may move from one network to another whilst ensuring that IP packets addressed to the mobile node can be sent to that mobile node using the same IP address as used to deliver IP packets and receive IP packets when the mobile node was connected to its home network.

One feature of Mobile IP is the mechanism by which a mobile node moves between networks. This is achieved by associating a mobile node with a home network and a home agent. IP packets which are to be sent to the mobile node are addressed to the mobile node's home address, within the mobile node's home network. The home agent monitors incoming packets to the home network and intercepts packets sent to the mobile node's home address if the mobile node has moved to another network. The home agent then forwards any intercepted packets to the mobile node, via the mobile access network to which the mobile node is currently attached.

For this arrangement to work the home agent has to be informed of the mobile node's whereabouts. When the mobile node detects it has moved from its home network to a visited network, it negotiates a care of address. The care of address is a temporary address allocated to the mobile node by the visited network. The mobile node then sends a binding update request to the home agent. The binding update request includes the temporary care of address. When the home agent receives the binding update request from the mobile node it performs a binding update procedure which enables IP packets to be sent to and from the mobile node. The binding update procedure differs depending on what version of the IP standard is being used (i.e. IPv4 or IPv6), but typically may involve establishing tunneling between the home agent and the mobile node. Other functions may also be performed before, during or after the binding update such as subscriber identification, authorisation and billing. It is an aim of the mobility support in Mobile IP, that movement between networks is transparent to a user. Therefore a mobile node engaged in a data communications session such as a voice call or an internet session, ideally should not experience a noticeable interruption or delay in data transmission.

In some scenarios, "hotspots" in airports or moving transport systems such as trains for example, there might be a high number of mobile nodes moving between networks. As a result, a correspondingly high number of binding update requests and high demand on parts of the network performing binding update procedures may result. If demand is sufficiently high, delays and interruptions in data transmissions may result. These delays may be noticeable to users engaged in applications requiring real time, or near real time data transmission such as voice calls or instant messaging.

SUMMARY OF THE INVENTION

According to the present invention there is provided a telecommunications system operable to provide a facility for a communications session to a mobile node using an internet protocol. The system comprises a first packet data network operable to communicate internet packets to and from the mobile node to provide the communications session when the mobile node is affiliated with the first packet radio network, and a second packet data network operable to communicate internet packets to and from the mobile node to provide the communications session when the mobile node is affiliated with the second packet data network. When the mobile node changes affiliation from one of the first and second packet data networks to the other of the first and second packet data networks, the mobile node is operable to generate a service level identifier representing a requested priority to be afforded to the internet packets communicated to and from the mobile node with respect to other internet packets communicated to and from other nodes. The mobile node is also operable to generate a binding update internet packet providing a care of address of the mobile node when the mobile node changes affiliation from one of the first and second packet radio network to the other of the first and second packet radio network and to include an indication of the service level identifier in the binding update internet packet. The mobile node is further operable to communicate the binding update internet data packets to a home agent of the mobile node, and the home agent is operable in response to the binding update, to identify the service level identifier and to differentiate the processing of the binding update based on the requested priority represented by the service level identifier.

Embodiments of the present invention provides a facility for distinguishing internet protocol packets sent to and from a mobile node depending on a priority requested by the mobile node when the mobile node switches affiliation from one network to another. Providing a service level identifier with a binding update allows a home agent to prioritise the communication of internet packets to and from the mobile node based on the requested level of service. The telecommunications system is therefore able to improve the efficiency with which network resources are used, so that mobile nodes running applications requiring a higher priority data transmission are less likely to experience an interruption, or delay in the communication of data, due to the use of network resources by mobile nodes running applications requiring a lower priority data transmission.

In one embodiment of the telecommunications system, once the binding update internet packet has been issued by the mobile node, a binding update process is performed by the home agent in accordance with the requested priority represented by the service identifier. Performing the binding update process in accordance with the requested priority allows the telecommunications system to use network resources in accordance with a relative priority to the effect that the order in which binding update processes are performed by the home agent is determined in accordance with the priority represented by the service level identifier. Mobile nodes running applications requiring a higher priority data transmission that have moved from one network to another will experience a reduced likelihood of interruption or delay communicating data as the re-establishment of a binding to a network is prioritised whereas a binding update for mobile nodes running applications requiring a lower priority data transmission will be performed according to a lower priority.

In some examples, the home agent may be operable in response to the binding update, to set up the service level identifier in one-to-one relation with a Home Address of the mobile node. The home agent may then differentiate the processing of the binding update based on the indication of the service level identifier and/or other mobility functions.

Various further aspects and features of the invention are defined in the appended claims.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF EXAMPLE EMBODIMENTS

An explanation of example embodiments of the invention will now be explained with reference to mobile internet protocols (Mobile IP) based systems.

Figure 1:
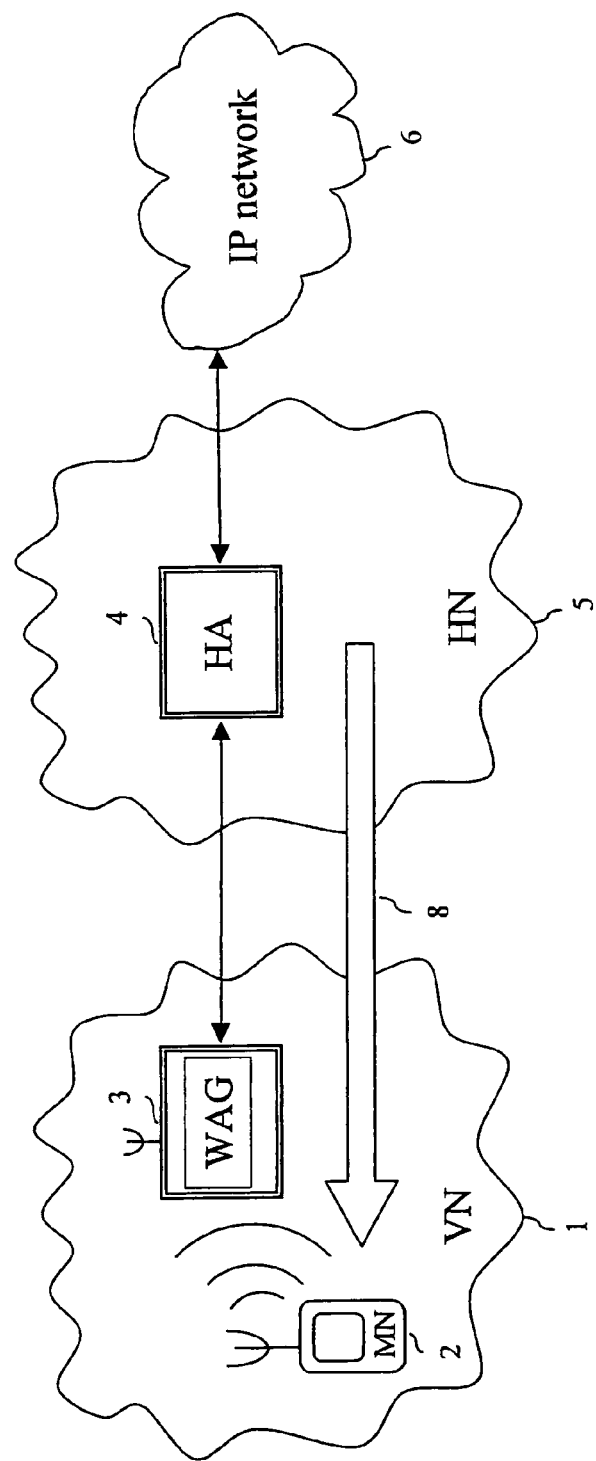
FIG. 1 provides a simplified schematic diagram of a mobile node moving from a home network to a visited network.

FIG. 1 provides a schematic diagram of a Mobile IP packet system. A mobile node (MN) 2 is in a visited network (VN) 1 having moved from a home network (HN) 5. IP packets are communicated to and from mobile node 2 to a home agent (HA) 4 in the home network 5, via a wireless access gateway (WAG) 3. IP packets communicated to and from the mobile node 2 can be communicated onward to and from an external IP network via the home agent 4. Mobile node 2 has a home address within the home network 5, to which all packets sent to the mobile node 2 from external IP networks are addressed.

Figure 2:
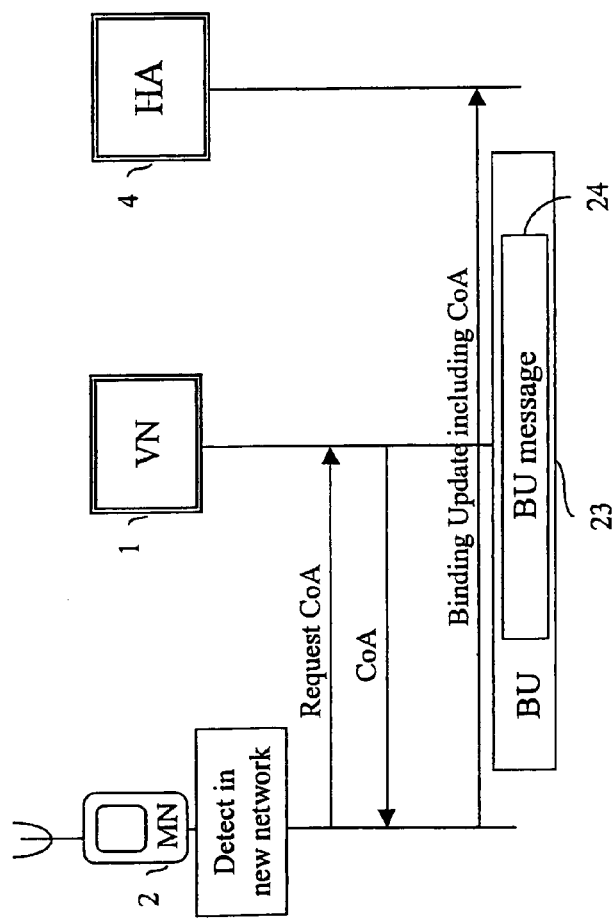
FIG. 2 provides a flow diagram showing the messages associated with a binding update procedure.

As shown in FIG. 2, when the mobile node 2 detects that it has moved from the home network 5 to the visited network 1, it requests a temporary "care of address" (CoA) from the visited network 1. When mobile node 2 has been allocated the care of address from the visited network 1, the mobile node 2 sends a binding update (binding update) IP packet 23 to the home agent 4. The binding update 23 contains a binding update message (binding update message) 24 which includes the temporary care of address of the mobile node 2. Upon receipt of the binding update, the home agent 4, associates the allocated care of address with the mobile node's home address. The home agent 4 is operable to monitor incoming IP packets to the home network and intercept those IP packets addressed to the mobile node's home address. Intercepted IP packets are then forwarded by the home agent 4 to the care of address of the mobile node 2.

Service Level Identifier

Figure 3:
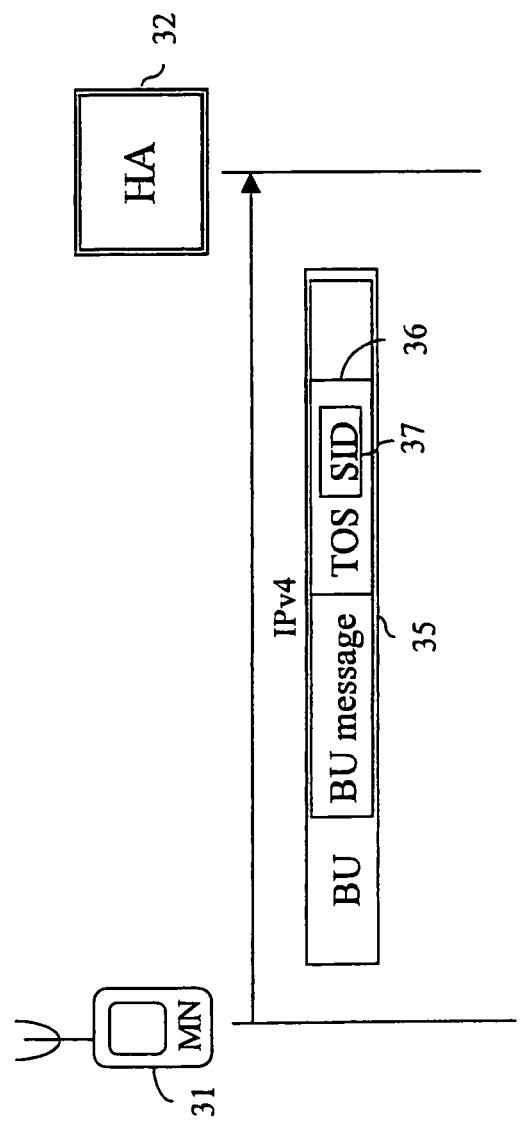
FIG. 3 provides a diagram showing the transmission of a binding update adapted to include a service level identifier.

In one embodiment, shown in FIG. 3, to reduce a problem associated with delays and interruptions in data transmission, which may be experienced by users of mobile nodes requiring real time or near real time data transmission, the mobile node 31 adapts a binding update 35 to include a service level identifier (SID) 37. The service level identifier 37 represents a priority to be afforded to the IP packets communicated to and from the mobile node 31 with respect to IP packets received from other mobile nodes operating in the Mobile IP system. Upon receipt of the binding update, the home agent 32 is operable to inspect the service level identifier 37 contained within the binding update 35 and afford a priority to IP packets sent to and received from the mobile node 31 according to the service level identifier 37.

In another embodiment, to reduce a problem associated with delays and interruptions in data transmission experienced by users of mobile nodes requiring real time or near real time data transmission, a home agent in a home network is operable to prioritise the processing of a binding update received from a mobile node in accordance with the service level identifier. Such a prioritisation allows the home agent to process binding updates from mobile nodes requiring a higher priority of data transmission before performing binding updates for mobile nodes requiring a lower priority of data transmission.

Service Level Identifier Cache

Figure 4:
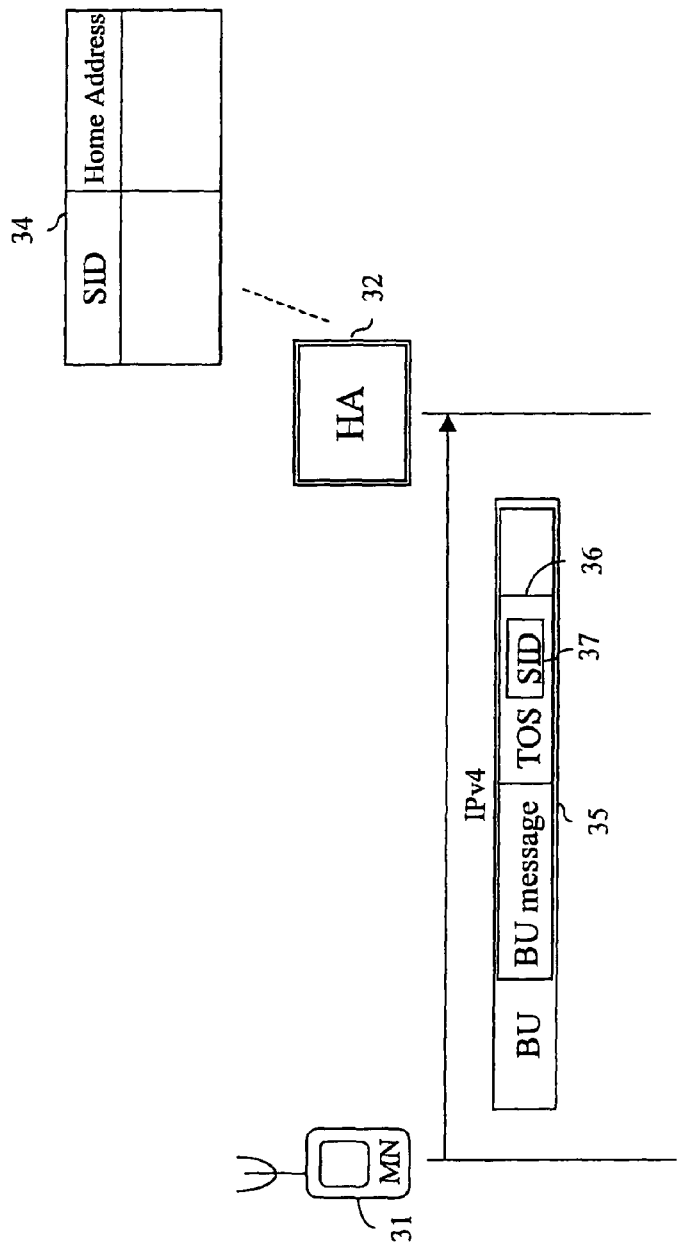
FIG. 4 provides a diagram showing the transmission of a binding update adapted to include a service level identifier and indicating a service level identifier cache.

As shown in FIG. 4, the home agent 32 maintains a service level identifier cache 34. Upon receipt of a binding update 35, the home agent 32 inspects the service level identifier 37 and stores it in the service level identifier cache 34 in association with a home address associated with the mobile node 31.

Figure 5:
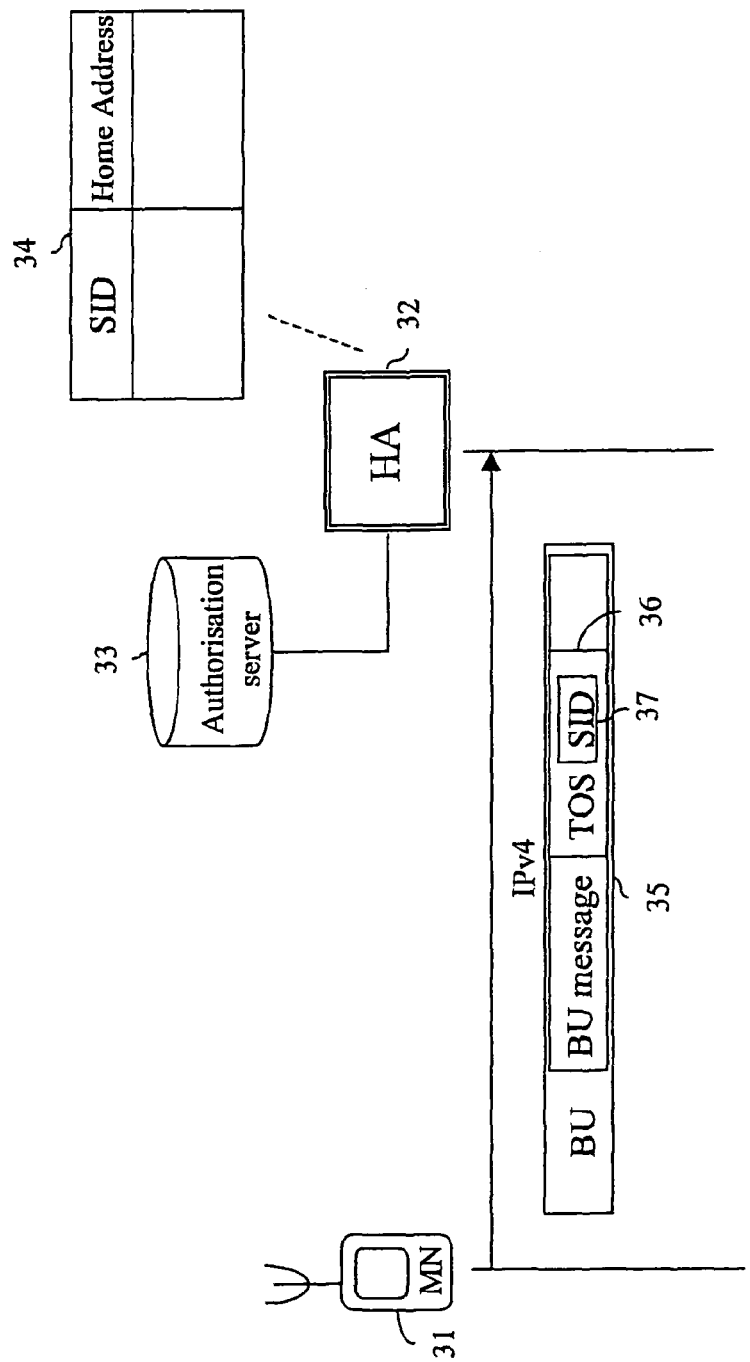
FIG. 5 provides a diagram showing the transmission of a binding update adapted to include a service level identifier and indicating a service level identifier cache and an authorisation server.

As shown in FIG. 5 the home agent 32 may be operable to compare the service level identifier 40 representing a requested priority with a stored profile associated with the home address of the mobile node 31. This stored profile is held in a authorisation server 33 and indicates a pre-set priority, which is authorised to be afforded to the mobile node 31. The pre-set authorised priority may be determined in accordance with a prescribed service level. If the requested priority represented by the service level identifier 37 is not a higher priority than is indicated by the stored profile in the authorisation server 33, the home agent 32 affords the requested priority to the communication of IP packets to and from the mobile node 31. The comparison can be achieved by the home agent 32 sending details of the service level identifier 37 to the authorisation server 33. The authorisation server 33 then sends a response back to the home agent 32 confirming the priority to afford the mobile node.

Type of Service Field for Service Level Identifier

Figure 6:
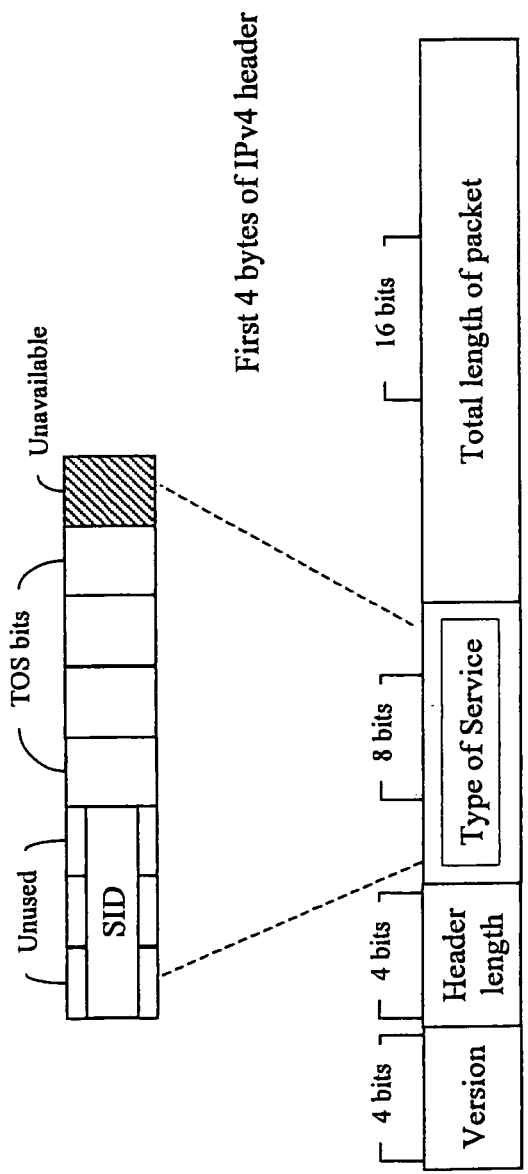
FIG. 6 shows an adaptation of an IPv4 header to include the service level identifier in unused bits of the type or service field.

In FIG. 3, the binding update 35 is an IPv4 packet and the binding update message is an IPv4 packet encapsulated within the binding update. The service level identifier is stored in unused bits of the type of service (TOS) field of an IP packet header. This is shown in FIG. 6.

Diffserv Marking for Service Level Identifier

Figure 7:
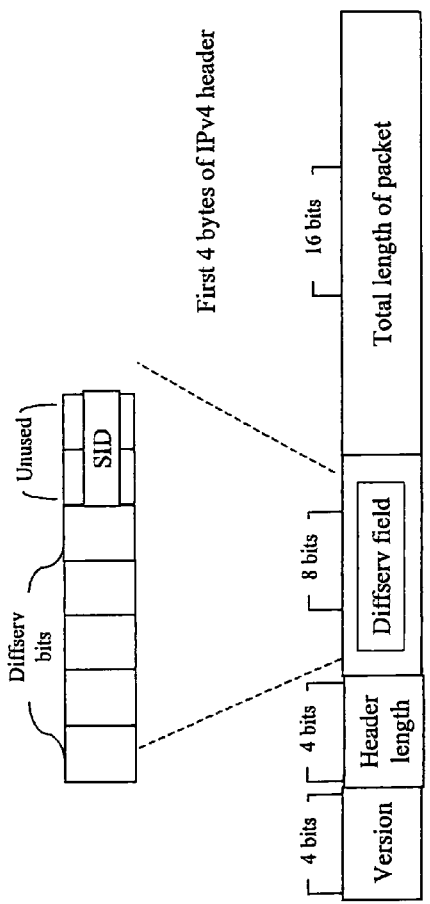
FIG. 7 shows an adaptation of an IPv4 header to include the service level identifier in unused bits of the diffserv field.

FIG. 7 shows the service level identifier stored in unused bits of a "Diffserv" field of an IPv4 packet header. In some IP scenarios, the TOS field is redefined as the Diffserv field. This will happen for example when IP networks in the Mobile IP system use a "Differentiated Service" protocol agreement. This is an agreement to forward IP packets on according to a quality of service indicated by the value all but the last two bits of the Diffserv field. When this is the case, it is the last two bits of the Diffserv (TOS) field which are used for representing the service level identifier. This is shown in FIG. 7.

IPv6 Flow ID for Service Level Identifier

Figure 8:
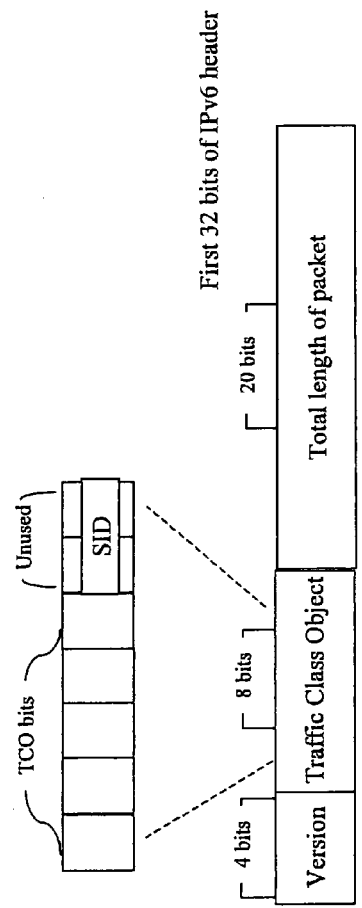
FIG. 8 shows an adaptation of an IPv6 header to include the service level identifier in unused bits of the traffic class object field.

As shown in FIG. 8, in one embodiment in a Mobile IP based system using the IPv6 internet protocol, the service level identifier can be stored in unused bits of the Flow ID field of an IPv6 packet header.

TCP/UDP

Mobile nodes engaged in applications requiring real time or near real time communication of IP packets might be using an IP user datagram protocol (UDP) session. The UDP protocol is relatively simple and fast because it does not include any error correction. Therefore UDP is appropriate for applications requiring fast communication of internet packets in which it is not critical if IP packets are occasionally lost or arrive in the wrong order. Such applications include data streaming and voice services such as voice over IP (VoIP).

Mobile nodes engaged in applications requiring non real time or "best effort" communication of IP packets might be using an IP transmission control protocol (TCP) session. This protocol includes error correction and is therefore appropriate for applications not requiring real time communication of internet packets but in which it is critical to avoid losing IP packets or IP packets arriving in the wrong order. Such applications include web browsing and email.

Figure 9:
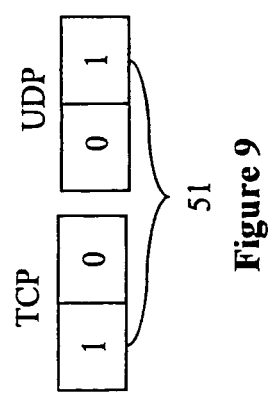
FIG. 9 shows arrangements of the service level identifier bits to represent a packet transmitted using the TCP protocol and arrangements of the service level identifier bits to represent a packet transmitted using the UDP protocol.

In one embodiment, shown in FIG. 9, the service level identifier bits 51, inserted into a binding update by a mobile node are set to "10" if the application the mobile node is running is an application using the TCP IP protocol. Whereas the service level identifier bits 51 are set to "01" of the application, the mobile node is running is an application using the UDP IP protocol.

SUMMARY OF INVENTION

Figure 10:
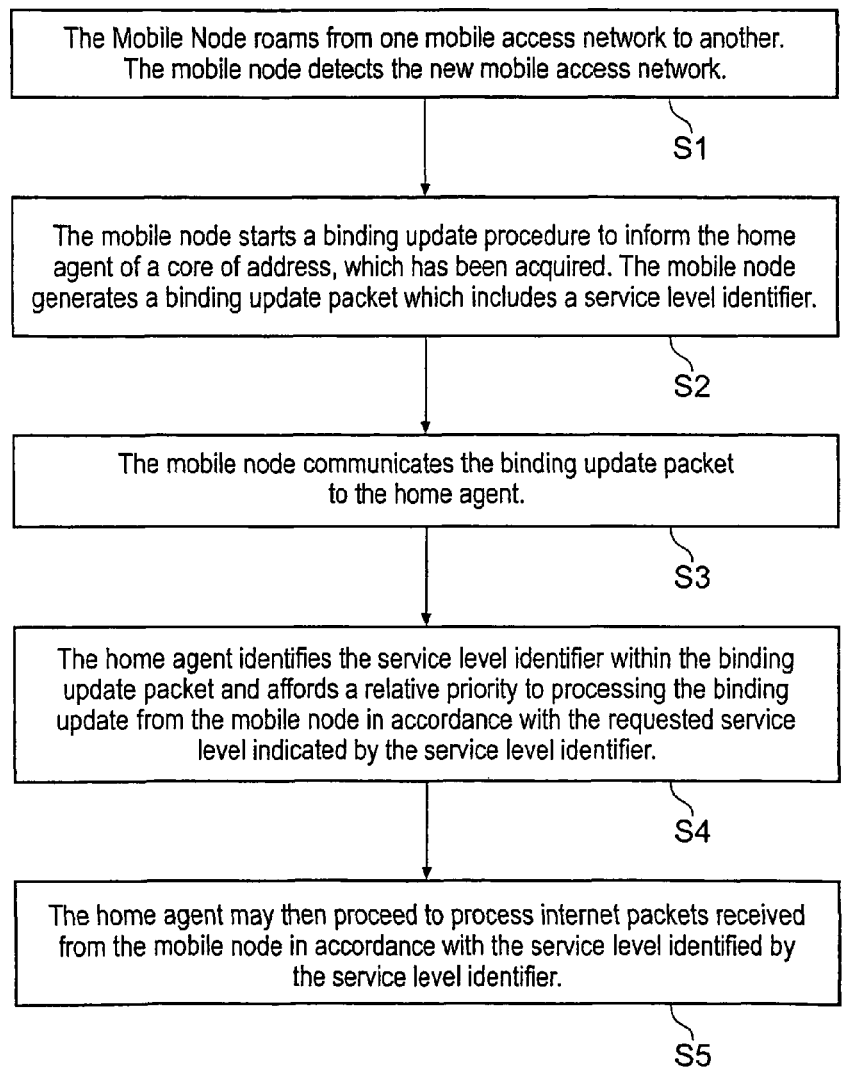
FIG. 10 is a flow diagram representing a process through which a mobile node performs a binding update and requests a priority using a service level identifier.

A flow diagram summarising a process through which a mobile node performs a binding update in accordance with the present technique is shown in FIG. 10. FIG. 10 therefore summarises the process through which the mobile node provides a service level identifier to its home agent for processing internet protocol packets received by the home agent for communication to and from the mobile node. FIG. 10 is summarised as follows:

S1 The mobile node roams from one mobile access network to another mobile access network. This may be, for example, roaming from its home mobile access network to a visited mobile access network although it will be appreciated that the mobile node may have already roamed to a visited mobile network and may be roaming to a further mobile access network. In either case, the present technique is equally applicable and the following example process steps may be performed. The mobile node therefore detects that it has entered a new mobile access network and that it will have to acquire a care of address for communicating internet protocol packets via that new mobile access network.

S2 The mobile node acquires a care of address, which is either self-generated or provided by a foreign agent within the new mobile access network. The provision of a foreign agent is, for example, more applicable to the case where the internet protocol is version 4 (IPV4). The mobile node then begins a binding update procedure to inform the home agent in its home mobile network of the care of address to be used for communicating internet packets to that mobile node whilst it is attached to the new visited mobile access network. In addition, the mobile node generates a binding update packet which includes a service level identifier. The service level identifier identifies a service level to be afforded to that mobile node through which a relative priority can be given to processing internet protocol packets from that mobile node.

S3 The mobile node then communicates the binding update packet to its home agent in its home mobile access network.

S4 The home agent receives the binding update packet and identifies the service level identifier within the binding update packet. Since the service level identifier is positioned at a predetermined position within the binding update packet the home agent can detect the service level identifier in each binding update packet received before it performs any other functions. Thus, by detecting the service level identifier for binding update packets received from all mobile nodes, within a certain period of time, for which the home agent is acting, a relative priority can be given to processing the binding update for each of the mobile nodes in accordance with the requested service level indicated by the service level identifier. At busy times such a prioritisation can be used to provide a relative ordering of the performance of the binding update processes with the effect that delay critical services, such as real time or near real time services, such as voice and video telephony can be prioritised over non-real time services such as e-mail.

S5 The home agent may then proceed to process internet packets received from the mobile node in accordance with the service level identified by the service level identifier. Thus, further ancillary processes may be performed in accordance with the relative priority identified by the service level identifier such as forwarding packets to the care of address or performing other functions such as authorisation, billing and the provision of services which may be deployed to the mobile node.

As will be appreciated from the summary set out above, since the home agent is arranged to identify the service level identifier in each of the binding update packets before performing any other function, for example identifying the mobile node from which the binding update packet has been received, a relative ordering of the processing of the binding update can be effected with the advantage of providing a higher priority to more delay-critical services.

Various further aspects and features of the present invention are defined in the appended claims. Various modifications can be made to the embodiments herein described without departing from the scope of the present invention. For example it will be appreciated that although embodiments of the invention have been described with reference to embodiments encompassing the Mobile IP, IPv4 and IPv6 standards, the present invention could be realised using other packet transfer protocols. For example, arrangements based on the network layer protocols provided in short range wireless standards such as Bluetooth, Zigbee, ultra wide band (UWB) or wireless USB (WUSB) could be used. Furthermore, although the service level identifier has been conveyed within spare bits within a number of IPv4 and IPv6 packets, it will be appreciated that in other examples the service level identifier may be conveyed in other fields or in other forms within a binding update.

The invention claimed is:

1. A telecommunications system operable to provide a facility
for a plurality of communications sessions to a plurality of respective mobile nodes using an internet protocol, the system comprising: for each mobile node:
a first packet data network operable to communicate internet packets to and from the mobile node to provide the communications session, when the mobile node is affiliated with the first packet data radio network, and
a second packet data network operable to communicate internet packets to and from the mobile node to provide the communications session, when the mobile node is affiliated with the second packet data network,
wherein, when changing affiliation from one of the first and second packet data networks to the other of the first and second packet data networks, the mobile node is configured:
to generate a service level identifier representing a requested priority to be afforded to the internet packets communicated to and from the mobile node with respect to other internet packets communicated to and from other nodes,
to generate a binding update internet packet providing a care of address of the mobile node when the mobile node changes affiliation from one of the first and second packet data networks to the other of the first and second packet data networks,
to include an indication of the service level identifier in the binding update internet packet, and
to communicate the binding update internet data packets to a home agent of the mobile node, the home agent operable in response to a plurality of binding updates communicated respectively by the plurality of mobile nodes:
to identify the service level identifier in each binding update, to differentiate a priority for each communicated binding update based on the requested priority represented by the identified service level identifier, and to process the binding updates based on the differentiated priorities.

2. A telecommunications system as claimed in claim 1, wherein the home agent is operable in response to a binding update communicated by one of the plurality of mobile nodes to set up the service level identifier in association with a home address of the mobile node.

3. A telecommunications system as claimed in claim 1, wherein
the indication of the service level identifier is provided by a value of a data field in a header of the internet packet.

4. A telecommunications system as claimed in claim 1, wherein
the service level identifier is provided by unallocated bits in a Type Of Service field in an Internet Protocol version 4 internet packet.

5. A telecommunications system as claimed in claim 1, wherein
the service level identifier is provided by unallocated bits in a Diffserv field in an Internet Protocol version 4 internet packet.

6. A telecommunications system as claimed in claim 1, wherein
the service level identifier is provided by unallocated bits in a Traffic Object Class field in an Internet Protocol version 6 internet packet.

7. A telecommunications system as claimed in claim 1, wherein
the home agent is operable to maintain a profile cache in which the service level identifier is stored in association with a home address of the mobile node.

8. A telecommunications system as claimed in claim 7, wherein
the home agent is operable to compare the requested priority represented by the service identifier to a pre-set priority associated with the home address, and
if the requested priority does not exceed the pre-set priority to process the internet packets in accordance with the requested priority represented by the service level identifier.

9. A telecommunications system as claimed in claim 1, wherein
the service identifier includes a representation of a least one of a UDP and TCP internet protocol.

10. A method of providing a plurality of communications sessions to a plurality of respective mobile nodes using an internet protocol, the method comprising:
communicating internet packets by a first packet data network to and from a mobile node when the mobile node is affiliated with the first packet data network;
communicating internet packets by a second packet data network to and from a mobile node when the mobile node is affiliated with the second packet data network;
when changing affiliation from one of the first and second packet data networks to the other of the first and second packet data networks, generating a service level identifier representing a requested priority to be afforded to the internet packets communicated to and from the mobile node with respect to other internet packets communicated to and from other nodes;
generating a binding update internet packet providing a care of address of the mobile node when the mobile node changes affiliation from one of the first and second packet data network to the other of the first and second packet data networks;
including an indication of the service level identifier in the binding update internet packet; and
communicating the binding update internet data packet to a home agent of the mobile node;
identifying the service level identifier in response to the binding update using the home agent;
differentiating a priority for each communicated binding update based on the requested priority represented by the identified service level identifier; and
processing binding updates based on the differentiated priorities.

11. A method as claimed in claim 10, including
setting up the service level identifier in association with a home address of the mobile node.

12. A method as claimed in claim 10, wherein
the indication of the service level identifier is provided by a value of a data field in a header of the internet packet.

13. A method as claimed in claim 10, wherein
the service level identifier is provided by unallocated bits in a Type Of Service field in an Internet Protocol version 4 internet packet.

14. A method as claimed in claim 10, wherein
the service level identifier is provided by unallocated bits in a Diffserv field in an Internet Protocol version 4 internet packet.

15. A method as claimed in claim 10, wherein
the service level identifier is provided by unallocated bits in a Traffic Object Class field in an Internet Protocol version 6 internet packet.

16. A method as claimed in claim 10, including
maintaining a profile cache in the home agent in which the service level identifier is stored in association with a home address of the mobile node.

17. A method as claimed in claim 16, including
comparing the requested priority represented by the service identifier to a pre-set priority associated with the home address, and
if the requested priority does not exceed the pre-set priority processing the internet packets in accordance with the requested priority represented by the service level identifier.

18. A method as claimed in claim 10, wherein the generating the service level identifier includes
generating a representation of a least one of a UDP and TCP internet protocol.

19. A telecommunications system as claimed in claim 2, wherein
the indication of the service level identifier is provided by a value of a data field in a header of the internet packet.

20. A telecommunications system as claimed in claim 2, wherein
the service level identifier is provided by unallocated bits in a Type Of Service field in an Internet Protocol version 4 internet packet.

21. A telecommunications system as claimed in claim 2, wherein
the service level identifier is provided by unallocated bits in a Diffserv field in an Internet Protocol version 4 internet packet.

22. A telecommunications system as claimed in claim 2, wherein
the service level identifier is provided by unallocated bits in a Traffic Object Class field in an Internet Protocol version 6 internet packet.

23. A method as claimed in claim 11, wherein
the indication of the service level identifier is provided by a value of a data field in a header of the internet packet.

24. A method as claimed in claim 11, wherein
the service level identifier is provided by unallocated bits in a Type Of Service field in an Internet Protocol version 4 internet packet.

25. A method as claimed in claim 11, wherein
the service level identifier is provided by unallocated bits in a Diffserv field in an Internet Protocol version 4 internet packet.

26. A method as claimed in claim 11, wherein
the service level identifier is provided by unallocated bits in a Traffic Object Class field in an Internet Protocol version 6 internet packet.

* * * * *